US00H002233H

(19) United States
(12) Statutory Invention Registration
Kramer

(10) Reg. No.: US H2233 H
(43) Published: Nov. 3, 2009

(54) CATALYSTS WHICH STABILIZE HYDROFLUOROCARBON BLOWING AGENTS IN POLYURETHANE FOAM COMPOSITIONS

(75) Inventor: Jeffrey Kramer, Schnecksville, PA (US)

(73) Assignee: Air Products and Chemicals, Inc., Allentown, PA (US)

(21) Appl. No.: 09/633,664

(22) Filed: Aug. 7, 2000

(51) Int. Cl.
*C08G 18/28* (2006.01)

(52) U.S. Cl. ..... 521/126; 521/127; 521/128; 521/129; 521/130; 521/131; 521/155; 521/170

(58) Field of Classification Search ..... 521/126, 521/127, 128, 129, 130, 131, 155, 170
See application file for complete search history.

(56) References Cited

U.S. PATENT DOCUMENTS 6,197,839 B1 * 3/2001 Genz et al. ..... 521/174

* cited by examiner

*Primary Examiner*—John M. Cooney, Jr.
(74) *Attorney, Agent, or Firm*—Michael Leach

(57) ABSTRACT

A composition comprising a polyisocyanate, a polyol, a hydrofluorocarbon blowing agent, optionally water, a surfactant, and at least one catalyst for the reaction of the polyisocyanate with the polyol and/or the reaction of the polyisocyanate with water, the catalyst being selected from the group consisting of triethylenediamine; N-2-hydroxypropyltriethylenediamine ammonium salt; N-cetyl-N,N-dimethylamine; N,N-diethylethanamine; N,N-dimethylaminoethylmorpholine; bis(3-dimethylaminopropyl)-N,N-dimethylpropanediamine; N-cyclohexyl-N-methylcyclohexylamine; 1,3,5-tris(3-(dimethylamino)propyl)hexahydro-s-triazine; bis(dimethylaminopropyl)methylamine; dibutyltin dilaurylmercaptide; dibutyltin diisooctylmaleate; dibutyltin bis(2-ethylhexylmercaptoacetate); stannous octoate, 1,2-dimethylimidizole, bis-(dimethylaminoethyl)ether; bis(3-dimethylaminopropyl)-N,N-dimethylpropanediamine and bis(N,N-dimethylaminoethyl)-ether and resulting in a decreased amount of decomposition of the hydrofluorocarbon blowing agent to fluoroalkene.

2 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CATALYSTS WHICH STABILIZE HYDROFLUOROCARBON BLOWING AGENTS IN POLYURETHANE FOAM COMPOSITIONS

FIELD OF THE INVENTION

The invention relates to closed cell polyurethane foams expanded with hydrofluorocarbons in the presence of specific polyurethane catalysts which also serve to maintain the chemical integrity of the hydrofluorocarbon during exposure of the foams to temperatures above ambient temperature.

BACKGROUND OF THE INVENTION

It is well known to those skilled in the art that polyurethane foams can be prepared by reacting and foaming a mixture of ingredients, consisting in general of an organic polyisocyanate and an appropriate amount of polyol or mixture of polyols in the presence of a volatile liquid blowing agent, which is caused to vaporize by the heat liberated during the reaction of the polyisocyanate and polyol. It is also well known that this reaction and foaming process can be enhanced through use of amine and metal carboxylate catalysts as well as surfactants. The catalysts ensure adequate curing of the foam while the surfactants regulate and control cell size.

In the class of foams known as low density, rigid polyurethane foam, the blowing agents of choice early on had been trichlorofluoromethane and dichlorodifluoromethane, known in the art as CFC-11 and CFC-12, respectively.

Due to the concern over the depletion of the ozone layer by chlorine atoms introduced to the atmosphere from the release of fully halogenated chlorofluorocarbons (CFCs), alternative blowing agents have been sought. Hydrochlorofluorocarbons (HFCs) such as HCFC-141b have been allowed temporarily to displace the CFCs. The HCFCs will in turn be phased out in favor of more environmentally acceptable hydrofluorocarbons (HFCs).

However, organic substances which bear a hydrogen on one carbon and a fluorine on an adjacent carbon will undergo elimination reactions under the influence of acids or bases to produce fluoroalkenes and hydrogen fluoride or products from the combination of the hydrogen fluoride with the base, known as salts.

Therefore, in view of the fact that some of the major and many of the minor components, e.g. polyols and catalysts, are of known basic character, dehydrofluorination of the HFCs might occur. Many of these fluoroalkenes possess unknown properties and it is therefore desirable to hold their formation to a minimum as a precautionary measure.

U.S. Pat. No. 5,668,834 discloses catalysts which stabilize hydrohalocarbon blowing agents in polyurethane foam formulations.

SUMMARY OF THE INVENTION

The use of certain catalysts, in addition to catalyzing the gelling, or polymerization, reaction of polyisocyanates and polyols and the blowing reaction of polyisocyanate and water, result in a decreased amount of decomposition of hydrofluorocarbon blowing agent to fluoroalkene during the reactions, and especially during use of the foam at elevated temperatures, such as temperatures of at least 54° C.

The present invention provides compositions comprising polyisocyanate, polyol, hydrofluorocarbon blowing agent, optionally water as an additional blowing agent, surfactant and at least one catalyst for polymerizing the polyisocyanate and polyol, i.e., the gelling reaction, and/or one catalyst for enhancing the blowing reaction of water with the polyisocyanate to generate carbon dioxide blowing agent.

Also provided is a method for making polyurethane foam comprising reacting a polyisocyanate with a polyol in the presence of a hydrofluorocarbon blowing agent, optionally water as an additional blowing agent, a surfactant and at least one catalyst for polymerizing the polyisocyanate and polyol, i.e., the gelling reaction, and/or one catalyst for enhancing the blowing reaction of water with the polyisocyanate.

The gelling catalysts for use in the invention include triethylenediamine (TEDA); N-2-hydroxypropyl-triethylenediamine ammonium salt; N-cetyl-N,N-dimethylamine; N,N-diethyl-ethanamine; N,N-dimethylaminoethylmorpholine; bis(3-dimethylaminopropyl)-N,N-dimethylpropanediamine; N-cyclohexyl-N-methylcyclohexylamine; 1,3,5-tris(3-(dimethylamino)propyl)hexahydro-s-triazine; bis(dimethylaminopropyl)methylamine; dibutyltin dilaurylmercaptide; dibutyltin diisooctylmaleate; dibutyltin bis(2-ethylhexylmercaptoacetate); stannous octoate and 1,2-dimethylimidizole.

Suitable blowing catalysts for use in the invention include bis-(dimethylaminoethyl)ether; bis(3-dimethylaminopropyl)-N,N-dimethylpropanediamine and bis(N,N-dimethylaminoethyl)ether.

The use of these catalysts provides for a reduction in the decomposition of the HFC blowing agents to fluoroalkenes.

DETAILED DESCRIPTION OF THE INVENTION

The invention provides a method and composition for making HFC-blown polyurethane foam in which specific catalysts are used to reduce the decomposition of the HFC blowing agent. The method comprises reacting a polyisocyanate and a polyol in the presence of an HFC blowing agent, optionally water as an additional blowing agent, the specified catalyst(s) and surfactant cell stabilizer.

The gelling catalysts for use in the invention include triethylenediamine; N-2-hydroxypropyl-triethylenediamine ammonium salt; N-cetyl-N,N-dimethylamine; N,N-diethyl-ethanamine; N,N-dimethylaminoethylmorpholine; bis(3-dimethylaminopropyl)-N,N-dimethylpropanediamine; N-cyclohexyl-N-methylcyclohexylamine; 1,3,5-tris(3-(dimethylamino)propyl)hexahydro-s-triazine; bis(dimethylaminopropyl)methylamine; dibutyltin dilaurylmercaptide; dibutyltin diisooctylmaleate; dibutyltin bis(2-ethylhexylmercaptoacetate); stannous octoate and 1,2-dimethylimidizole. The preferred gelling catalysts are triethylenediamine; N-2-hydroxypropyl-triethylenediamine ammonium salt; N-cetyl-N,N-dimethylamine; bis(3-dimethylaminopropyl)-N,N-dimethylpropanediamine; N-cyclohexyl-N-methylcyclohexyl-amine; 1,3,5-tris(3-(diamethylamino)propyl)hexahydro-s-triazine; and bis(dimethylamino-propyl)methylamine.

Suitable blowing catalysts for use in the invention include bis-(dimethylaminoethyl)ether; bis(3-dimethylaminopropyl)-N,N-dimethylpropanediamine and bis(N,N-dimethylaminoethyl)ether.

In addition to the above amine gelling and blowing catalysts, also useful would be their acid blocked derivatives, i.e. the amine compounds existing as the salt with an organic acid, such as formic acid, acetic acid, 2 ethylhexanoic acid and the like.

The foregoing amine and tin catalysts are well known in the art and may be obtained commercially from urethane catalyst suppliers such as Air Products and Chemicals, Inc.

At least one catalyst is used in the present invention. Depending upon the catalyst selected, mixtures of two or more catalysts may be desirable.

The amount of the catalyst employed in the invention will vary depending upon the catalyst selected, the application, the type of foam being prepared, the identity of the polyol and other factors, but can readily be determined by anyone skilled in the art. The catalyst is used in an amount sufficient to catalyze the reaction of the polyisocyanate and the polyol and/or water, and also results in a decreased amount of decomposition of the hydrofluorocarbon blowing agent to fluoroalkene during the polymerization. Preferably, the catalyst is present at an amount of at least 0.1 parts by weight per hundred parts of polyol (pphpp). More preferably, the catalyst is present at an amount of 0.1 to 5 pphpp.

In accordance with this invention, any of these catalysts or combinations of these catalysts may be used to prepare a variety of polyurethane foams by standard techniques known in the art which may include the use of various standard additives such as surfactants, water, fire retardants, and others.

Typically used ratios of polyisocyanate to polyol and of a blowing agent to those components may be used in practicing the invention. The suitable polyisocyanates, polyols and surfactant cell stabilizers are those that can be found in any of the polyurethane foam patent literature including U.S. Pat. No. 5,688,834, 5,824,177; and U.S. Pat. No. 5,852,065 which are incorporated by reference.

The use of the catalyst will provide rigid foams with significantly reduced levels of fluoroalkenes formed during polymerization and especially during foam use at elevated temperatures compared to levels of fluoroalkenes found when using catalysts commonly used in the rigid foam industry such as N,N-dimethylcyclohexylamine.

In practicing the invention, the molar ratio of polyisocyanate to polyol is about 1.1:1. As those skilled in the art know, the use of polyisocyanate to polyol in an amount of about 1.1:1 results in the formation of polyurethane foams.

Any hydrofluorocarbon blowing agent may be used in the present invention. Such hydrofluorocarbon blowing agents include 1,1-difluoroethane; 1,2-difluoroethane; 1,1,1-trifluoroethane; 1,1,2-trifluoroethane; 1,1,1,2-tetrofluoroethane; 1,1,2,2-tetrofluoroethane; 1,1,1,2,2-pentafluoroethane; 1,1,1,3-tetrafluoropropane; 1,1,2,3,3-pentafluoropropane; and 1,1,1,3,3-pentafluoro-n-butane. The preferred HFC blowing agents are 1,1,1,3-tetrafluoropropane (HFC-245fa) and 1,1,1,2-tetrofluoroethane (HFC-134a).

Mixtures of the HFC blowing agents with water and/or with hydrocarbon blowing agents such as pentane may also be used in the present invention. Also useful may be mixtures of the preferred hydrofluorocarbon blowing agents HFC-245fa and HFC-134a.

The term "fluoroalkene" is used to mean those organic compounds having at least one double bond and at least one fluorine atom. The fluroalkenes which form depend on the hydrofluorocarbon blowing agent used. For example, the blowing agent 1,1,1,3,3-pentafluoropropane (HFC-245fa) would decompose to 1,3,3,3 tetrafluoropropene (HFC-1234ze).

EXAMPLE 1

This example shows the use of specified catalysts in the HFC-245fa blown rigid polyurethane foam formulation of Table 1.

TABLE 1

| Component | Parts by Weight |
|---|---|
| Polyol[a] | 100 |
| Catalysts | 2.6 |
| Water | 2.0 |
| HFC-245fa[b] | 34.2 |
| Silicone Surfactant | 3.0 |
| Polymeric MDI | NCO Index = 115 |

[a]Sucrose initiated polyether polyol, OH number = 360.
[b]1,1,1,3,3-pentafluoropropane The materials for use as the catalyst in the above formulation include gelling catalysts triethylenediamine; N-2-hydroxypropyl-triethylenediamine ammonium salt; N-cetyl-N,N-dimethylamine; bis(3-dimethylaminopropyl)-N,N-dimethylpropanediamine; N-cyclohexyl-N-methylcyclohexylamine; and 1,3,5-tris(3-(dimethylamino) propyl)-hexahydro-s-triazine; and blowing catalysts bis (dimethylaminopropyl)methylamine; bis-(dimethylaminoethyl)ether; bis(3-dimethyl-aminopropyl)-N,N-dimethylpropanediamine and bis(N,N-dimethylaminoethyl) ether.

The ingredients in Table 1 are combined and incubated at 10° C. until the mixture has equilibrated to temperature. The resin is weighed into a paper cup and the silicone surfactants is added. Polymeric MDI at 23° C. is added in an amount such that the isocyanate (NCO) index is 115. The mixture is stirred with a high speed mixer for 8 seconds and poured into a 12×12×2 inch (30.5×30.5×5.1 cm) mold which is heated to 49° C. Enough of the foaming mixture is added to the mold to yield a plaque which is 5% overpacked. The foam plaque is removed from the mold after 4 minutes and aged at 23° C. for 18 to 24 hours.

The invention claimed is:

1. A composition comprising a polyisocyanate, a polyol, a hydrofluorocarbon blowing agent, optionally water as an additional blowing agent, a surfactant, and at least one catalyst for the reaction of the polyisocyanate with the polyol and/or the reaction of the polyisocyanate with water, the catalyst being selected from the group consisting of triethylenediamine; N-2-hydroxypropyltriethylenediamine ammonium salt; N-cetyl-N,N-dimethylamine; N,N-diethylethanamine; N,N-dimethylaminoethylmorpholine; bis(3-dimethylamino-propyl)-N,N-dimethylpropanediamine;

N-cyclohexyl-N-methylcyclohexylamine; 1,3,5-tris(3-(dimethylamino)propyl)hexahydro-s-triazine; bis(dimethylaminopropyl)methylamine; dibutyltin dilaurylmercaptide; dibutyltin diisooctylmaleate; dibutyltin bis(2-ethylhexylmercaptoacetate); stannous octoate, 1,2-dimethylimidizole; bis-(dimethylaminoethyl)ether; bis(3-dimethylaminopropyl)-N,N-dimethylpropanediamine and bis(N,N-dimethylaminoethyl)ether and resulting in a decreased amount of decomposition of the hydrofluorocarbon blowing agent to fluoroalkene.

2. A process for preparing polyurethane foam which comprises reacting a polyol with a polyisocyanate in the presence of a hydrofluorocabon blowing agent, optionally water as an additional blowing agent, a surfactant, and at least one catalyst selected from the group consisting of trithylenediamine; N-2-hydroxypropyltriethylenediamine ammonium salt; N-cetyl-N,N-dimethylamine; N,N-diethyl-ethanamine; N,N-dimethylaminoethylmorpholine; bis(3-dimethylaminopropyl)-N,N-dimethylpropanediamine; N-cyclohexyl-N-methylcyclohexylamine; 1,3,5-tris(3-dimethylamino)popyl)-hexahydro-s-triazine; bis(dimethylamino-propyl)methylamine; dibutyltin dilaurylmercaptide; dibutyltin diisooctylmaleate; dibutyltin bis(2-ethylhexylmercaptoacetate); stannous octoate, 1,2-dimethylimidizole, bis-(dimethylaminoethyl)ether; bis(3-dimethylaminorpopyl)-N,N-dimethylpropanediamine and bis(N,N-dimethylaminoethyl)ether, in which the catalyst results in a decreased amount of decomposition of the hydrofluorocarbon blowing agent to fluoroalkene.

* * * * *